March 10, 1959      J. R. CLARK ET AL      2,876,677
AIRBORNE MISSILE TO CARRIER AIRCRAFT ATTACHMENT ARRANGEMENT
Filed Aug. 27, 1956      3 Sheets-Sheet 1
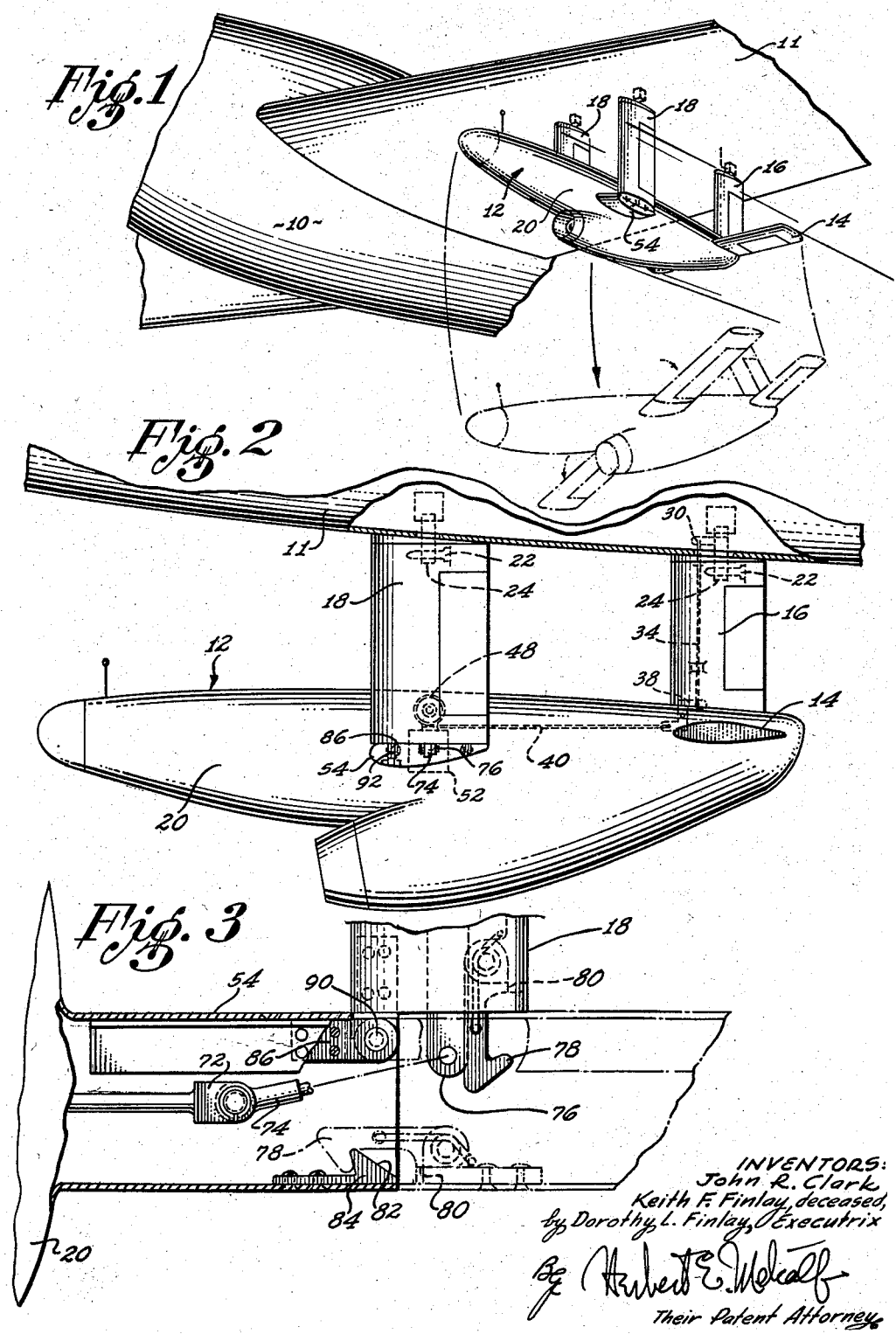
INVENTORS:
John R. Clark,
Keith F. Finlay, deceased,
by Dorothy L. Finlay, Executrix
Their Patent Attorney March 10, 1959 J. R. CLARK ET AL 2,876,677
AIRBORNE MISSILE TO CARRIER AIRCRAFT ATTACHMENT ARRANGEMENT
Filed Aug. 27, 1956 3 Sheets-Sheet 2
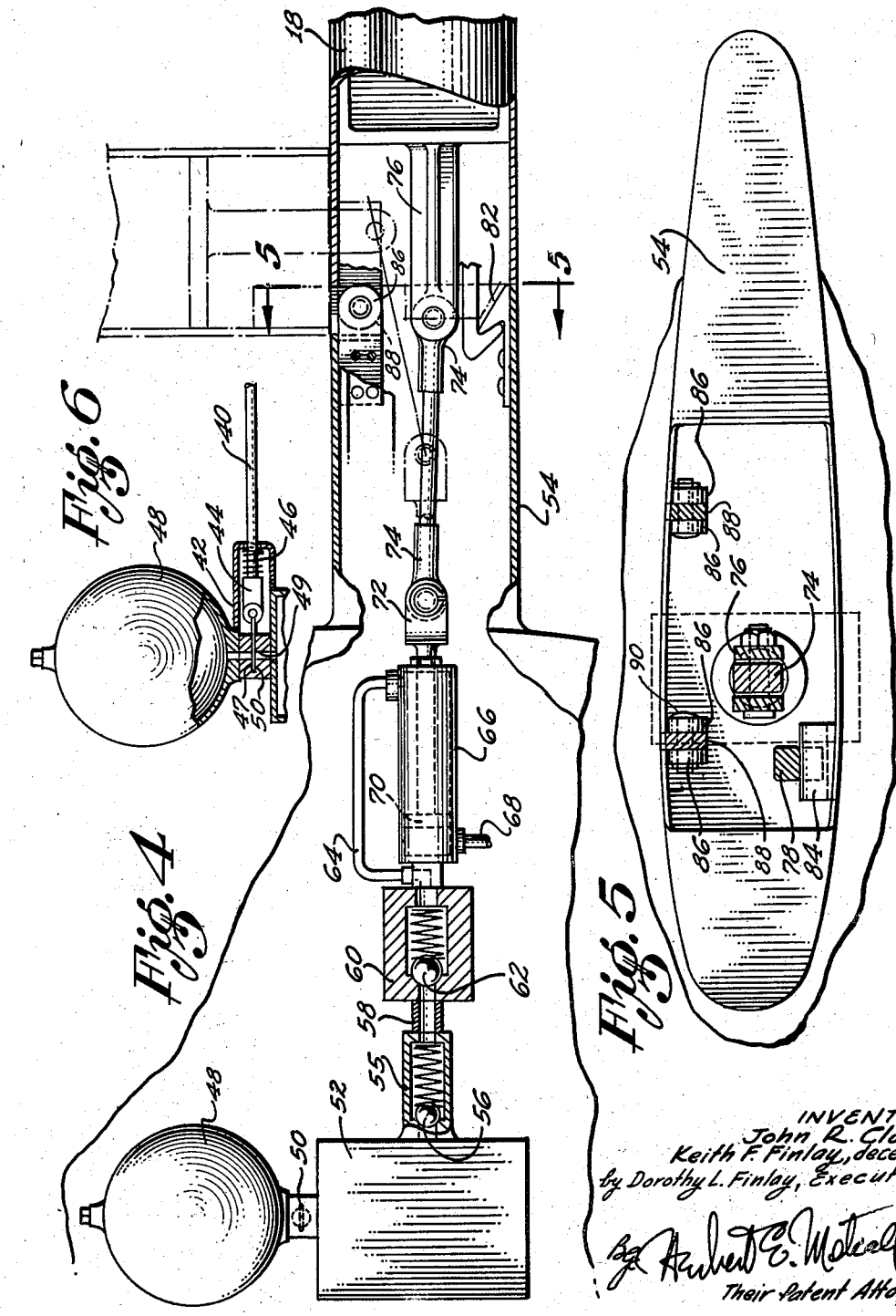
INVENTORS
John R. Clark,
Keith F. Finlay, deceased,
by Dorothy L. Finlay, Executrix
Their Patent Attorneys

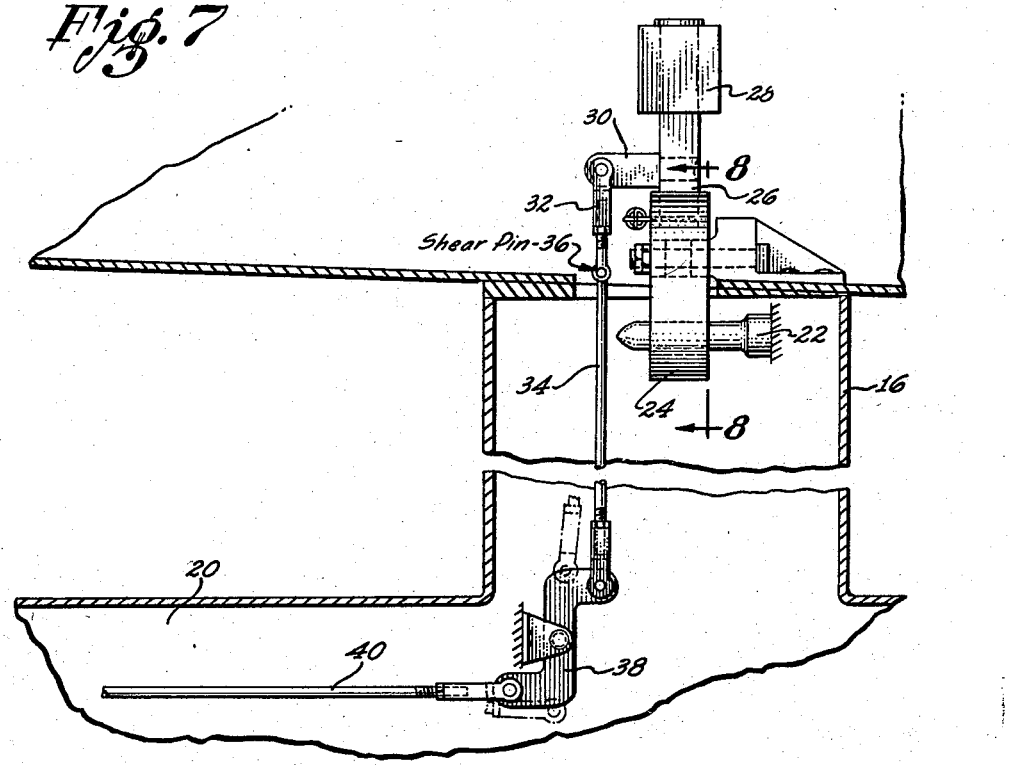
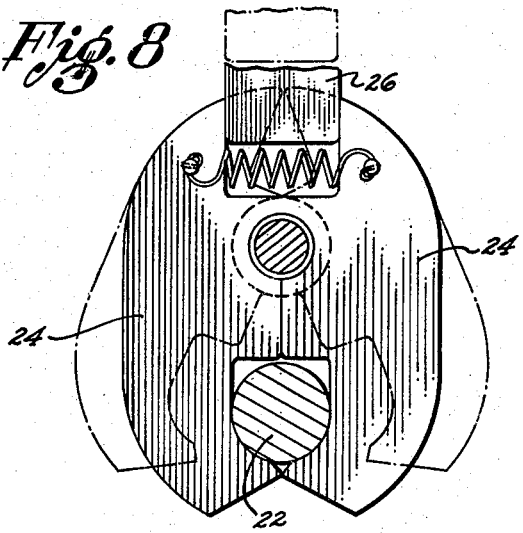

United States Patent Office 2,876,677
Patented Mar. 10, 1959

2,876,677

AIRBORNE MISSILE TO CARRIER AIRCRAFT ATTACHMENT ARRANGEMENT

John R. Clark, Rolling Hills, Calif., and Keith F. Finlay, deceased, late of Los Angeles, Calif., by Dorothy L. Finlay, executrix, Los Angeles, Calif., assignors, by mesne assignments, to Northrop Aircraft, Inc., Hawthorne, Calif., a corporation of California Application August 27, 1956, Serial No. 606,527

9 Claims. (Cl. 89—1.5)

This invention has to do with missiles that are borne aloft by and released from a carrier aircratf.

An object of this invention is to provide a missile having retractable wings that in the vertical position are releasably attached to the carrier aircraft by quick release structure.

Another object of this invention is to provide a missile having retractable wings that will extend from the vertical to the horizontal position automatically when the missile is released from the carrier aircraft.

A yet further object of this invention is to provide structure in the missile that will extend the retractable wings thereof, but only after a time period has elapsed and the missile is clear of the carrier aircraft and other airborne missiles.

A still further object of this invention is to provide structure in the missile that will lock the retractable wings in the horizontal position.

Briefly, the invention has to do with a missile that is suspended from and carried aloft by a carrier aircraft. Quick release and attaching mechanism is provided in the retractable wings of the missile and the aircraft, and a time delay system is included in the missile structure for extending the wings from a vertical to a horizontal position and locking the same.

Figure 1 is a fragmentary perspective view ilustrating and having embodied therein the present invention, and showing, in solid lines, the method of carrying the missile and in dotted lines the missile after release from the carrier aircraft.

Figure 2 is an enlarged, fragmentary and perspective view showing the missile and illustrating schematically, in dotted lines, certain structure located in the missile wings and fuselage.

Figure 3 is a fragmentary, partly cross-sectional view showing the hinge and locking structure between the fuselage of the missile and the retractable wings.

Figure 4 is a partly cross-sectional view illustrating one form of the linking and time delay system that has been provided for the purpose of extending the retractable wings, of the missile, from the vertical to the horizontal position.

Figure 5 is a cross-sectional view taken on line 5—5 of Figure 4 looking in the direction indicated.

Figure 6 is a cross-sectional view illustrating the valve opening and closing structure as applied to a pressurized gas reservoir.

Figure 7 is a cross-sectional view illustrating the linkage system between the missile and carrier aircraft.

Figure 8 is a cross-sectional view taken on lines 8—8 in Figure 7, looking in the direction indicated and illustrating the quick release hook structure provided for carrying the missile aloft.

Referring to the drawings for a more detailed description of the present invention 10 designates a "carrier aircraft" having depending from one illustrated wing 11 a missile 12, Figure 1. The term "carrier aircraft" as applied above and hereafter is to be considered in the broadest sense and is to include a manned airplane, rocket plane, lighter-than-air ship, as well as other types of aircraft.

The missile 12 has horizontal stabilizers 14, a vertical stabilizer 16, and a pair of retractable wings 18 pivotally linked to wing stubs 54 extending from a fuselage 20. The missile, as illustrated in Figures 1 and 2, may be of the glide or free fall type or it may be turbojet, ram jet or rocket powered.

Although the structure to be hereinafter described is shown as applying to only one wing it is to be understood that said structure is duplicated and applies to both wings of the missile 12.

Attention is directed to Figures 7 and 8, wherein the releasing and holding structure may be seen. Rigidly mounted in the vertical stabilizer 16, as well as in the tip of each wing 18 is a pin 22, and a pair of spring loaded hooks 24, located in the wing 11, engages each pin 22. A plunger 26 of a solenoid 28 is positioned between the hooks, against the urging of the hook springs, to maintain them in a pin 22 engaging position. The plunger 26, located adjacent the vertical stabilizer 16, has an arm 30 thereon and pivotally attached to the arm is a link 32. The link 32 is releasably attached to a rod 34 by a shear pin 36. That end of the rod 34 opposed to shear pin 36 is pivotally fixed to a bell crank 38, and the bell crank is in turn pivotally attached to a bracket that is mounted in the vertical stabilizer 16 of the missile 12. Another rod 40, pivotally attached to the bell crank 38, extends through the fuselage 20 of the missile 12 as may be determined by referring to Figure 2 of the drawings.

One end of the rod 40 extends through a bracket 42, Figure 6, and has a fitting 44 on the end thereof. A spring 46 seats against the fitting 44 and the bracket 42 to urge the fitting and rod 40 toward a pressurized gas reservoir 48. The Bungee bottle or pressurized gas reservoir 48 is mounted on or secured to the bracket 42. The neck of the bottle has a slot 47 transverse to a discharge opening 49 therein. A slide gate 50 attached to fitting 44 is urged by the spring 46 into the slot 47 to close the opening 49.

The opening 49 of the pressurized gas reservoir 48 is mounted over a liquid filled tank 52, located adjacent the wing stubs 54, as may be determined by referring to Figures 2 and 4 of the drawings.

Integral with one side of the tank 52 is an elongated nozzle 55 that is maintained closed by a spring loaded ball check 56. Secured to the nozzle 55 is a nipple spacer 58 and secured to the nipple spacer is a valve body 60 having an opening therethrough that is maintained closed by another spring loaded ball check 62.

Attention is directed to the fact that the force necessary to overcome the closing force of ball check 62 is different than that for ball check 56. For instance, a greater force is required to overcome ball check 62 than is required for ball check 56. The result of this construction is that a time delay system is provided.

That side of the body 60 in opposed relation to the nipple spacer 58 has an angular opening therein into which one end of a length of tubing 64 is threaded. The other end of the tubing 64 is threaded into one end of a hydraulic cylinder 66 in the manner illustrated in Figure 4. The cylinder 66 has a discharge line 68 therein that is in opposed relationship to that end of the tubing threaded therein. Located in the cylinder 66 is a piston and rod 70 that is acted upon by the liquid that may be hydraulic fluid.

The piston and rod 70 has an extension 72 thereon that is exterior of the cylinder 66. The extension 72 has one end of a link 74 pivotally attached thereto and the other end of the link 74 is pivotally attached to a bar 76 that is located in the wings 18 of the missile 12.

Referring now to Figures 3 to 5 inclusive, 78 designates a spring loaded hook that is located in the wings 18. The hook 78, as illustrated in the solid line position of the wings 18 in Figure 3, is urged against a stop 80. When the wings 18 are being extended, the hook strikes the cam face 82 of a retainer 84 and is lifted off the stop 80. When the wings 18 are fully extended, as indicated in dotted lines, the hook 78 drops behind the retainer 84 and locks the wings in place.

The wing stubs 54 have a pair of brackets 86 secured thereto that receive projections 88 on wings 18. The brackets 86 and projections 88 are connected by pins 90 to provide hinge axis about which wings 18 rotate. Attention is directed to the fact that the hinge structure, constituting brackets 86, projections 88 and pins 90 in combination with the wing 18 and wing stub 54, limits the folding of the wings 18, in the attached position, to the vertical and does not allow overtravel. This provision militates against undesired movement of the missile when carried aloft and in the flow of air.

The operation of the invention is as follows: Assume the missile 12 to be suspended from the wings 11 of the carrier aircraft 10 in the manner illustrated in Figure 1 of the drawings. The wings 18 of the missile are retracted or folded to the vertical position.

At the proper time the solenoids 28 are energized to withdraw the plunger 26 from between the hooks 24. This movement of the solenoid plunger 26 permits the hooks to open and further causes the ram 30 to alter its position which carries with it the link 32, the rods 34 and 40. The last mentioned rods move to the dotted line position illustrated in Figure 7. The movement of the rod 40 results in pulling the gate 50 toward the bell crank 38 and against the force of the spring 46. The result is that the gas under pressure in the reservoir 48 is permitted to pass through the opening 49 in the neck thereof and into the liquid filled tank 52.

Following the withdrawal of the plunger 26 from between the hooks 24, the missile is considered to be launched and is free to fall from the carrier aircraft. The fall momentarily results in applying a force on the rods 34 and 40 which is also transmitted to the gate 50 to further overcome the force of the spring 46. This force is relieved when the shear pin 36 between rod 34 and link 32 is severed. The spring 46 pulls the rod 34 within the wings 18 and urges the gate 50 back into the closing position and traps the gas that had entered the tank 52.

The gas entering the tank 52, exerts a force on the liquid therein. This initial force overcomes the nozzle closing force of spring loaded ball check 56 to permit liquid to pass through the nozzle 55. The liquid is restrained in nozzle 55 and nipple spacer 58 until the force or pressure thereon exceeds the force of the spring loaded ball check 62. When the force on the liquid exceeds the force of the spring loaded ball check 62 the liquid passes through the tubing 64 and into the cylinder 66 to urge the piston and rod 70 to the position illustrated in Figure 4. Such liquid as may be in the cylinder 66 that will oppose the movement of the piston and rod 70 is urged out the discharge line 68.

The movement of the piston and rod 70 is transmitted to the vertically positioned wings 18 through extension 72, link 74 and bar 76 to cause the wings to alter their position from the vertical to the horizontal position. The wings 18 are locked in place by hook 78 engaging retainer 84 in the manner previously described. It is to be noted that the liquid force imposed on piston and rod 70 also assists in retaining the wings 18 in the horizontal position.

Further, attention is directed to the fact that the spring loaded ball checks 56 and 62 also function as a time delay factor for the reason that liquid forces must first be obtained to overcome the forces of the springs before the wings 18 may be extended. This time delay enables the missile 12 to fall free of the carrier aircraft 10 and other missiles before the wings 18 are extended.

The invention as illustrated and described refers to a three point suspension; i. e., suspension from the two vertically folded wings, and the vertical stabilizer. However, the structure may be readily modified whereby a two point suspension may be obtained; i. e., suspension from the vertically folded wings only.

For instance, in place of the linkage system from the solenoid 28 in the vertical stabilizer to the pressure reservoir 48 a flexible cable may be located in the wings adjacent or releasably attached to the solenoid 28 located therein. The cable could readily be attached to the reservoir 48 and do exactly the same thing as illustrated.

While in order to comply with the statute, the invention has been described in language more or less specific as to structural features, it is to be understood that the invention is not limited to the specific feature shown, but that the means and construction herein disclosed comprise a preferred form of putting the invention into effect, and the invention is therefore claimed in any of its forms or modifications within the legitimate and valid scope of the appended claims.

What is claimed is:

1. An airborne missile to carrier aircraft attachment arrangement comprising: a body, having a pair of hinged members that pivot to and from a horizontal and vertical position, that is supported by an aircraft and the members when the members are in a vertical position; a vertical element on said body; quick release means in said members, element and carrier aircraft for releasing and supporting said body on said aircraft; and a time delay system in said body and element and connected to said members that actuates the latter to change their position from the vertical to the horizontal after release thereof from the carrier aircraft.

2. An airborne missile to carrier aircraft attachment arrangement comprising: a body, having a pair of hinged members that pivot to and from a horizontal and vertical position, that is supported by an aircraft and the members when the members are in a vertical position; a vertical element on said body; quick release means in said members, element, and carrier aircraft for releasing and supporting said body on said aircraft; a time delay system in said body and element and connected to said members that actuates the latter to change their position from the vertical to the horizontal after release thereof from the carrier aircraft; and structure for locking said members in the horizontal position.

3. An airborne missile to carrier aircraft attachment arrangement comprising: a body, having a pair of hinged members that pivot to and from a horizontal and vertical position, that is supported by an aircraft and the members when the members are in a vertical position; a vertical element on said body; quick release means in said members, element and carrier aircraft for releasing and supporting said body on said aircraft; a time delay system in said body and element end connected to said members that actuates the latter to change their position from the vertical to the horizontal after release thereof from the carrier aircraft; said quick release means being solenoid actuated, spring loaded, hooks.

4. An airborne missile to carrier aircraft attachment arrangement comprising: a body, having a pair of hinged members that pivot to and from a horizontal and vertical position, that is supported by an aircraft and the members when the members are in a vertical position; a vertical element on said body; quick release means in said members, element and carrier aircraft for releasing and supporting said body on said aircraft; a time delay system in said body and element and connected to said members that actuates the latter to change their position from the vertical to the horizontal after release thereof; said time delay system being fluid powered.

5. An airborne missile to carrier aircraft attachment arrangement comprising: a body, having a pair of hinged members that pivot to and from a horizontal and vertical position, that is supported by an aircraft and the members when the members are in a vertical position; a vertical element on said body; quick release means in said members, element and carrier aircraft for releasing and supporting said body on said aircraft; a time delay system in said body and element and connected to said members that actuates the latter to change their position from the vertical to the horizontal after release thereof from the carrier aircraft; and structure for locking said members in the horizontal position; said quick release means being solenoid actuated, spring loaded, hooks.

6. An airborne missile to carrier aircraft attachment arrangement comprising: a body having a pair of hinged members that pivot to and from a horizontal and vertical position, that is supported by an aircraft and the members when the members are in a vertical position; a vertical element on said body; quick release means in said members, element and carrier aircraft for releasing and supporting said body on said aircraft; a time delay system in said body and element and connected to said members that actuates the latter to change their position from the vertical to the horizontal after release thereof from the carrier aircraft; and structure for locking said members in the horizontal position; said time delay system being fluid powered.

7. An airborne missile to carrier aircraft attachment arrangement comprising: a body, having a pair of hinged members that pivot to and from a horizontal and vertical position, that is supported by an aircraft and the members when the members are in a vertical position; a vertical element on said body; quick release means in said members, element, and carrier aircraft for releasing and supporting said body on said aircraft; a time delay system in said body and element and connected to said members that actuates the latter to change their position from the vertical to the horizontal after release thereof from the carrier aircraft; and structure for locking said members in the horizontal position; said structure being a hook and said system.

8. An airborne missile to carrier aircraft attachment arrangement comprising: a body, having a pair of hinged members that pivot to and from a horizontal and vertical position, that is supported by an aircraft when the members are in a vertical position; quick release means in said members for releasing and supporting said body on said aircraft; and a time delay system in said body and members that actuate the latter to change their position from the vertical to the horizontal after release thereof from the carrier aircraft.

9. An airborne missile to carrier aircraft attachment arrangement comprising: a body, having a pair of hinged members that pivot to and from a horizontal and vertical position, that is supported by an aircraft when the members are in a vertical position; quick release means in said members for releasing and supporting said body on said aircraft; a time delay system in said body and members that actuate the latter to change their position from the vertical to the horizontal after release thereof from the carrier aircraft; and structure for locking said members in the horizontal position.

References Cited in the file of this patent

UNITED STATES PATENTS

| 2,289,224 | Swanson et al. | July 7, 1942 |
| 2,290,850 | Umschweif | July 21, 1942 |
| 2,548,053 | Pierson et al. | Apr. 10, 1951 |
| 2,780,422 | Maglio | Feb. 5, 1957 |

FOREIGN PATENTS

| 565,468 | Great Britain | Nov. 13, 1944 |
| 566,201 | Great Britain | Dec. 19, 1944 |